US008514873B2

(12) United States Patent
Yang et al.

(10) Patent No.: US 8,514,873 B2
(45) Date of Patent: *Aug. 20, 2013

(54) ADVANCED TELECOMMUNICATIONS ROUTER AND CROSSBAR SWITCH CONTROLLER

(75) Inventors: Brian Hang Wai Yang, Monterey Park, CA (US); Kai-Yeung (Sunny) Siu, San Jose, CA (US); Mizanur M. Rahman, Cupertino, CA (US); Wei-Han Lien, Cupertino, CA (US); Gaurav Singh, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/890,551

(22) Filed: Sep. 24, 2010

(65) Prior Publication Data

US 2011/0013643 A1   Jan. 20, 2011

Related U.S. Application Data

(63) Continuation of application No. 12/170,269, filed on Jul. 9, 2008, now Pat. No. 7,826,477, which is a continuation of application No. 10/302,015, filed on Nov. 21, 2002, now Pat. No. 7,426,216.

(51) Int. Cl.
*H04L 12/54*        (2013.01)

(52) U.S. Cl.
USPC ........................... 370/412; 370/428; 370/461

(58) Field of Classification Search
None
See application file for complete search history.

(56) References Cited

U.S. PATENT DOCUMENTS

| 5,367,518 | A | | 11/1994 | Newman |
| 5,546,391 | A | | 8/1996 | Hochschild et al. |
| 5,583,867 | A | * | 12/1996 | Poole .......................... 370/257 |
| 5,734,649 | A | | 3/1998 | Carvey et al. |
| 6,307,854 | B1 | | 10/2001 | Webb |
| 6,356,111 | B1 | * | 3/2002 | Moss .............................. 326/41 |
| 6,370,148 | B1 | | 4/2002 | Calvignac et al. |
| 6,477,174 | B1 | | 11/2002 | Dooley et al. |
| 6,631,131 | B1 | | 10/2003 | Sonnier et al. |
| 6,735,212 | B1 | * | 5/2004 | Calamvokis .................. 370/412 |
| 6,999,453 | B1 | * | 2/2006 | Chemla et al. ................ 370/389 |
| 7,023,840 | B2 | | 4/2006 | Golla et al. |
| 7,102,999 | B1 | * | 9/2006 | Sindhu et al. ................. 370/235 |
| 7,158,510 | B1 | | 1/2007 | Golla et al. |
| 7,426,216 | B2 | | 9/2008 | Yang et al. |

(Continued)

OTHER PUBLICATIONS

"1.0 Method of ensuring Fairness among Queues in a Wavefront Arbiter," SiSilk Networks Confidential ASIC-02-01: 1-10 (Nov. 4, 2002).

(Continued)

*Primary Examiner* — Hassan Phillips
*Assistant Examiner* — Duc Duong
(74) *Attorney, Agent, or Firm* — Sterne, Kessler, Goldstein & Fox P.L.L.C.

(57) ABSTRACT

An apparatus and method to receive first service request signals and second service request signals from virtual signal queues, to map the virtual signal queues according to a first mapping, to arbitrate the first service request signals in accordance with the first mapping of the virtual signal queues, and to re-map the virtual signal queues according to a second mapping, different from the first mapping, to allow arbitrating of the second service request signals in accordance with the second mapping of the virtual signal queues.

20 Claims, 13 Drawing Sheets

(56) References Cited

U.S. PATENT DOCUMENTS

| | | | |
|---|---|---|---|
| 7,826,477 B2 | 11/2010 | Yang et al. | |
| 2003/0058880 A1* | 3/2003 | Sarkinen et al. | 370/413 |
| 2004/0090974 A1* | 5/2004 | Balakrishnan et al. | 370/412 |

OTHER PUBLICATIONS

"10.2 Arbcore," SiSilk Networks: 70-78 (Oct. 23, 2001).
"11.0 Alternate Arbcore implementation," SiSilk Networks: 79-87 (Oct. 30, 2001).
"Binary Tree," accessed at World Wide Web mathworld.wolfram.com/BinaryTree.html.
"Crossbar Arbitration" SiSilk Networks Proprietary and Confidential (Oct. 30, 2001).
Delgado-Frias, et al., "A VLSI Wrapped Wave Front Arbiter for Crossbar Switches".
International Search Report for International Application No. PCT/US02/37571, mailed on Apr. 14, 2003.
Partridge, et al., "A Fifty Gigabit Per Second IP Router" BBN Technologies.
Seshan, S., "15-744: Computer Networking," (2002).

* cited by examiner

|   | 1 | 2 | 3 | 4 | 5 |
|---|---|---|---|---|---|
| A | 0 | 1 | 0 | 0 | 0 |
| B | 1 | 0 | 1 | 0 | 1 |
| C | 0 | 0 | 1 | 0 | 1 |
| D | 0 | 0 | 0 | 1 | 0 |
| E | 1 | 0 | 0 | 0 | 0 |

FIG. 2A

|   |   |   |   |   |
|---|---|---|---|---|
| 0 |   |   |   |   |
|   | 0 |   |   |   |
|   |   | 1 |   |   |
|   |   |   | 1 |   |
|   |   |   |   | 0 |

FIG. 2B

|   |   |   |   |   |
|---|---|---|---|---|
|   | 1 |   |   |   |
|   |   | 1 |   |   |
|   |   |   | 0 |   |
|   |   |   |   | 0 |
| 1 |   |   |   |   |

FIG. 2C

|   |   |   |   |   |
|---|---|---|---|---|
|   |   | 0 |   |   |
|   |   |   |   | 0 |
|   |   |   |   | 1 |
| 0 |   |   |   |   |
|   | 0 |   |   |   |

FIG. 2D

|   |   |   |   |   |
|---|---|---|---|---|
|   |   |   | 0 |   |
|   |   |   |   | 1 |
| 0 |   |   |   |   |
|   | 0 |   |   |   |
|   |   | 0 |   |   |

FIG. 2E

|   |   |   |   |   |
|---|---|---|---|---|
|   |   |   |   | 0 |
| 1 |   |   |   |   |
|   |   | 0 |   |   |
|   |   |   | 0 |   |
|   |   |   |   | 0 |

| | 0 | 1 | 2 | 3 |
|---|---|---|---|---|
| 0 | 00 | 01 | 02 | 03 |
| 1 | 10 | 11 | 12 | 13 |
| 2 | 20 | 21 | 22 | 23 |
| 3 | 30 | 31 | 32 | 33 |

FIG. 7B

| | 0 | 1 | 2 | 3 |
|---|---|---|---|---|
| 0 | 01 | 02 | 03 | 00 |
| 1 | 11 | 12 | 13 | 10 |
| 2 | 21 | 22 | 23 | 20 |
| 3 | 31 | 32 | 33 | 30 |

FIG. 7C

| | 0 | 1 | 2 | 3 |
|---|---|---|---|---|
| 0 | 10 | 11 | 12 | 13 |
| 1 | 20 | 21 | 22 | 23 |
| 2 | 30 | 31 | 32 | 33 |
| 3 | 00 | 01 | 02 | 03 |

FIG. 7D

| | 0 | 1 | 2 | 3 |
|---|---|---|---|---|
| 0 | 11 | 12 | 13 | 10 |
| 1 | 21 | 22 | 23 | 20 |
| 2 | 31 | 32 | 33 | 30 |
| 3 | 00 | 01 | 02 | 03 |

FIG. 9A

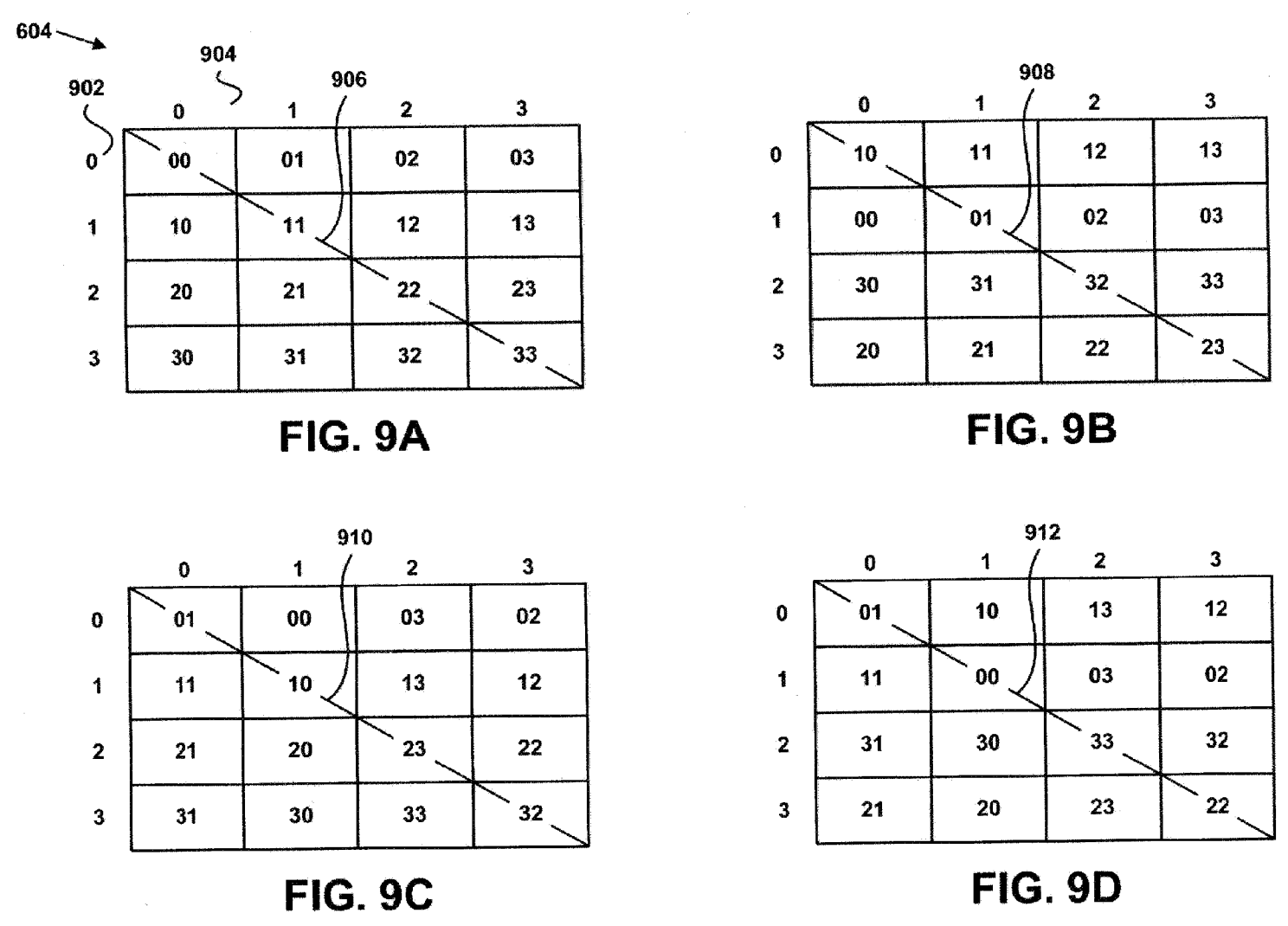

|   | 0 | 1 | 2 | 3 |
|---|---|---|---|---|
| 0 | 00 | 01 | 02 | 03 |
| 1 | 10 | 11 | 12 | 13 |
| 2 | 20 | 21 | 22 | 23 |
| 3 | 30 | 31 | 32 | 33 |

FIG. 9B

|   | 0 | 1 | 2 | 3 |
|---|---|---|---|---|
| 0 | 10 | 11 | 12 | 13 |
| 1 | 00 | 01 | 02 | 03 |
| 2 | 30 | 31 | 32 | 33 |
| 3 | 20 | 21 | 22 | 23 |

FIG. 9C

|   | 0 | 1 | 2 | 3 |
|---|---|---|---|---|
| 0 | 01 | 00 | 02 | 03 |
| 1 | 11 | 10 | 12 | 13 |
| 2 | 21 | 20 | 22 | 23 |
| 3 | 31 | 30 | 32 | 33 |

FIG. 9D

|   | 0 | 1 | 2 | 3 |
|---|---|---|---|---|
| 0 | 01 | 10 | 12 | 12 |
| 1 | 11 | 00 | 03 | 02 |
| 2 | 31 | 30 | 33 | 32 |
| 3 | 21 | 20 | 23 | 22 |

ADVANCED TELECOMMUNICATIONS ROUTER AND CROSSBAR SWITCH CONTROLLER

REFERENCE TO RELATED APPLICATIONS

This application is a continuation of U.S. application Ser. No. 12/170,269, filed on Jul. 9, 2008, which is a continuation of U.S. application Ser. No. 10/302,015, filed Nov. 21, 2002 which, in turn, claims priority to U.S. Prov. No. 60/333,945, filed Nov. 20, 2001, which are all both incorporated herein by reference in their entireties.

FIELD

The invention relates to the field of telecommunications, and more particularly to an advanced telecommunications router and crossbar switch controller.

BACKGROUND

Advances in network communication and switching are moving ahead with great speed. The advent of optical network connections requires the evolution of network switching technologies that can perform at high rates.

Conventional technology requires a very large number of devices to achieve the high rates and does not provide support for future high data rate switching needs. One of the hindrances of conventional technology is the use of the crossbar switch and associated algorithms for setting the switch. Crossbar switch technology is relatively simple in theory, but can be very complicated to optimize since for each piece of data, there can be a number of switches that need to be set and those switches may conflict with transmission of another piece of data. Some people have attempted to develop techniques that can provide support for high data rates, for example, U.S. Pat. No. 5,734,649 describes a crossbar switch algorithm that attempts to optimize the decision tree, and U.S. Pat. No. 5,500,858 describes another technique. However, such techniques do not provide sufficient bandwidth for future needs.

What are needed are an advanced telecommunications router and crossbar switch controller that is capable of performing at a level consistent with optical network systems.

SUMMARY

The invention overcomes the identified limitations and provides an advanced telecommunications router and crossbar switch controller. A conventional crossbar switch includes a number of input ports that are switched to a number of output ports. The switches are located at the cross-points of a number of wires. Since the crossbar switch has a large number of paths that the data can flow through to get to its destination, the switches are set in advance of transferring the data. The mechanism for setting the switches is called an arbiter. The invention provides a highly efficient arbiter that includes a number of new technologies for improving speed and switch selection. By servicing the signals in a very efficient manner, the invention supports very high throughput by the router.

In one embodiment, the invention relates to a crossbar switch controller including an input terminal configured to receive a set of service request signals from a set of virtual output queues each comprising a set of packets. The invention also includes a matrix circuit coupled to the input terminal and configured to represent the set of service request signals in the form of a matrix, wherein each service request signal is described by a row position M and a column position N. The invention further includes an output terminal configured to receive a portion of the set of packets during an epoch, an arbiter circuit configured to iteratively scan the matrix during the epoch and issue the set of grant signals to the virtual output queues to determine which service requests are granted, and an arbiter controller configured to initiate the arbiter circuit with an array of non-conflicting matrix elements. Whereby, the arbiter circuit scans the matrix during a first epoch, issues the set of grant signals, allows the set of granted service requests to substantially complete, and if necessary, scans the matrix during subsequent epochs.

In another embodiment, the invention relates to a crossbar switch controller including an arbitration pre-processor coupled to the input terminal and the matrix circuit, and configured to represent the set of service request signals in the form of a mapping matrix, and further configured to transform a first mapping position of the service request signal to a second mapping position based, in part, on a mapping algorithm. The invention also includes an arbitration post-processor coupled to the output terminal and the matrix circuit, and further configured to transform the second mapping position of the service request signal back to the first mapping position.

In another embodiment, the invention relates to a method of optimizing a crossbar switch controller. The method further includes configuring an input terminal to receive a set of service request signals from a set of virtual output queues each comprising a set of packets. The method also includes coupling a matrix circuit to the input terminal, configuring the matrix circuit to represent the set of service request signals in the form of a matrix, and coupling an output terminal to the matrix circuit. The method further includes configuring the output terminal to receive a portion of the set of packets during an epoch, coupling an arbiter circuit to the matrix circuit, and configuring the arbiter circuit to iteratively scan the matrix during the epoch and issue the set of grant signals to the virtual output queues to determine which service requests are granted. The method further includes coupling an arbiter controller to the arbiter circuit, configuring the arbiter controller to initiate the arbiter circuit with an array of non-conflicting matrix elements, scanning the matrix during a first epoch, and issuing the set of grant signals. The method further includes allowing the set of granted service requests to substantially complete; and if necessary, scanning the matrix during subsequent epochs.

Advantages of the invention include the ability to manage high data rates using a crossbar switch, as well as improving arbitration fairness without substantial detriment to crossbar switch performance.

BRIEF DESCRIPTION OF THE FIGURES

The present invention is illustrated by way of example, and not by way of limitation, in the figures of the accompanying drawings and in which like reference numerals refer to similar elements and in which:

FIGS. 2A-F illustrate a matrix of ready virtual output queues according to an embodiment of the invention, and an example of an iterative examination of wavefronts;

FIG. 5A-D depict a simplified matrix of arblets in a crossbar switch according to an embodiment of the invention;

FIG. 7A-D depict a simplified matrix of virtual output queues for an arbitration-preprocessor employing a rotation mapping algorithm according to an embodiment of the invention;

FIG. 9A-D depict a simplified matrix of virtual output queues for an arbitration-preprocessor employing a hierarchical mapping algorithm according to an embodiment of the invention; and, FIG. 10 depicts a simplified functional logic diagram for an arbitration-preprocessor employing a switch network mapping algorithm according to an embodiment of the invention.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Internet Protocol, but any packet protocol is applicable. Moreover, reference is made to chips that contain integrated circuits while other hybrid or meta-circuits combining those described in chip form is anticipated. The exemplary embodiment is provided for a 5×5 switch, but could be any other number consistent with switch technology.

A. CROSSBAR SWITCH ARCHITECTURE AND METHOD

Figure 1:
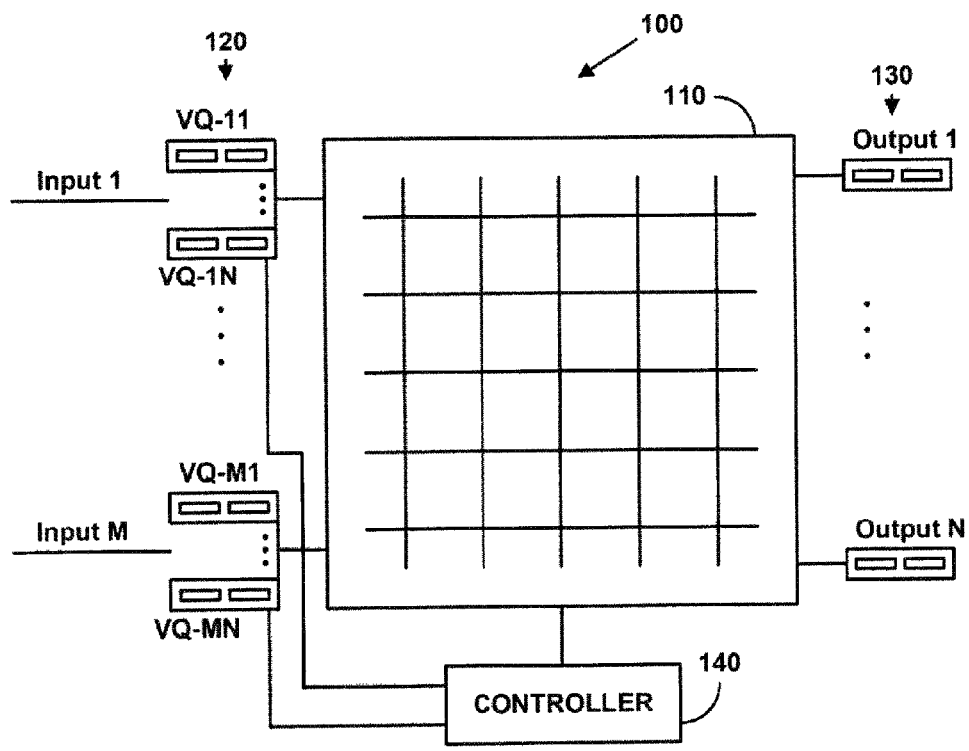
FIG. 1 depicts a crossbar switch for telecommunications switching, such as would be deployed in an Internet router, showing a set of virtual output queues, a switch matrix, a set of output queues and an arbiter according to an embodiment of the invention.

FIG. 1 depicts a crossbar switch 100 for telecommunications switching, such as would be deployed in an Internet router. The heart of the switch 100 is the crossbar circuitry 110 (sometimes called a switch matrix), which is comprised of a series of rows and columns with switches at the intersections thereof. A set of virtual output queues 120 (VQ-11 to VQ-MN) are coupled to external data sources and buffer the data to be transferred by the crossbar circuitry 110. The switch matrix may often be square (M=N), but is not required to be so. A set of output queues 130 are also coupled to the crossbar circuitry and are designed to transfer the outbound data to external circuits. A controller 140 is coupled to the virtual output queues and the switch matrix. Each data transfer is performed during a period of time called an epoch, and the switch is typically set up during the epoch immediately preceding the data transfer.

FIGS. 2A-F illustrate a matrix of ready virtual output queues according to an embodiment of the invention. This is referred to as a request matrix. FIG. 2A represents the matrix of virtual output queue service requests. The squares designated as 1 are those making a service request and those designated at 0 are not. A goal of the invention is to set the switch matrix to allow the most data to pass through the switch while preventing data collisions. In order to do this, the invention employs a method that determines non-conflicting data transfer requests and then grants the requests. A request that would conflict prior grant is denied until a subsequent epoch.

Figure 3B:
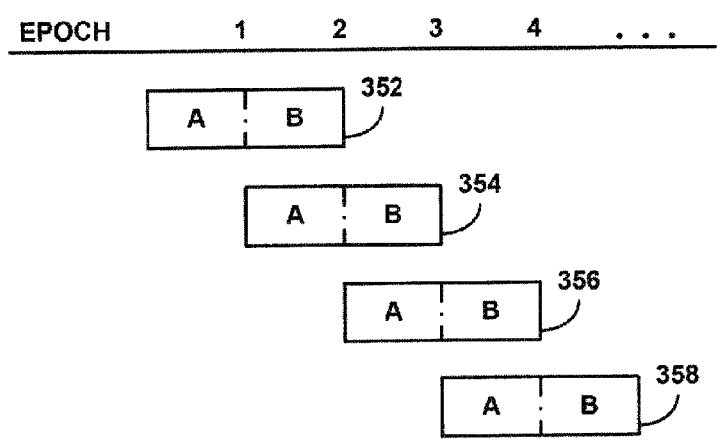
FIG. 3B is a timeline showing the steps of FIG. 3A performed over time.
Figure 3A:
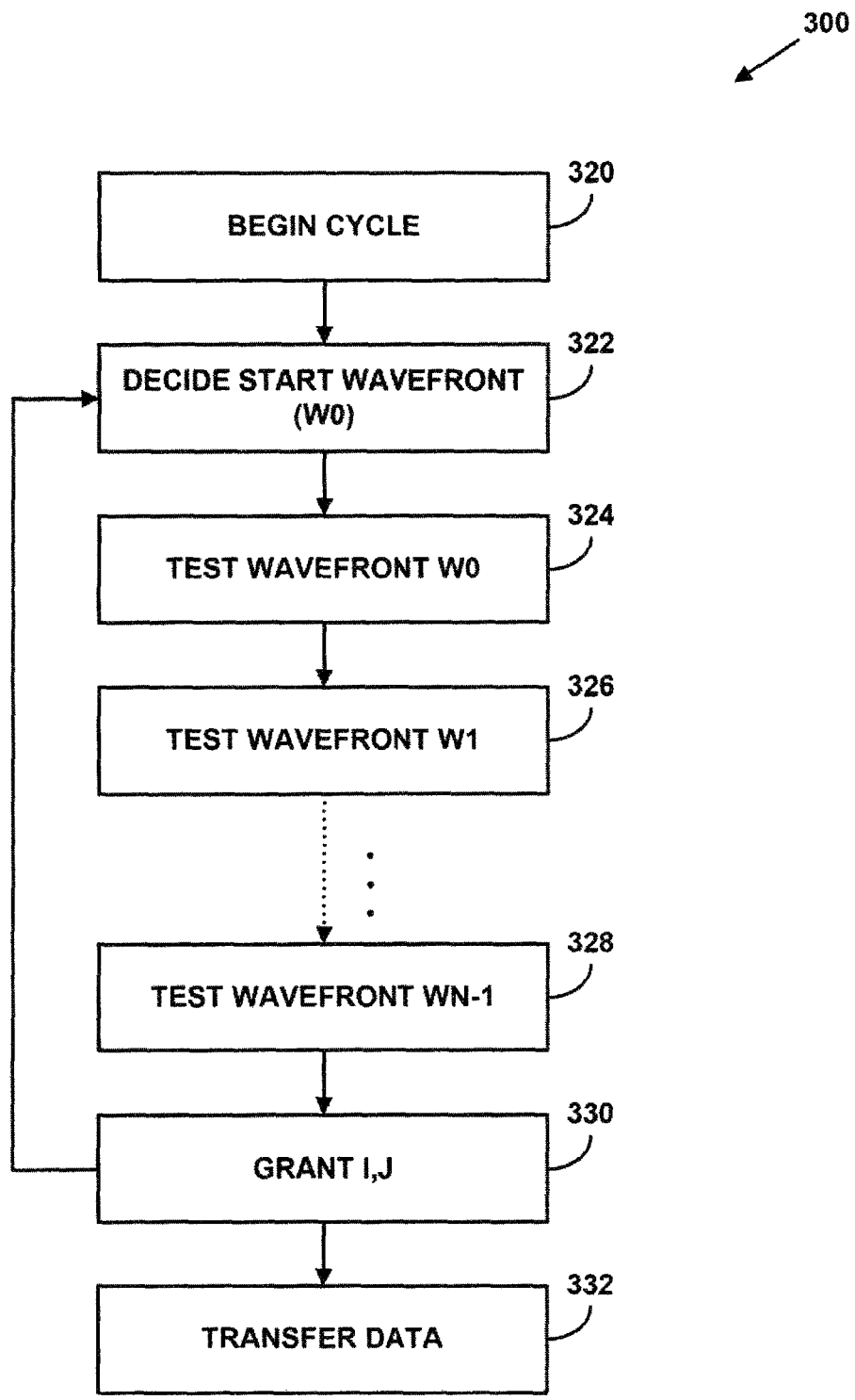
FIG. 3A is a flowchart showing steps performed during the arbitration and data transfer cycles according to an embodiment of the invention.

FIG. 3A is a flowchart showing steps performed during the arbitration and data transfer cycles according to an embodiment of the invention. FIG. 3 will be explained in conjunction with FIGS. 2B-2F. In step 320, the data is buffered at the virtual output queues and is ready to be transferred by the switch 100. In step 322, the controller selects a first group of squares to be tested (called a wavefront). The selection can be made arbitrarily, or based on available information such as the wavefront with the most requests, or other technique. In step 324, the first wavefront W0 is tested. Referring to FIG. 2B, the first wavefront W0 is a group of squares (A1, B2, C3, D4, E5). Note that these squares do not share a column or row with one another, which means that granting any request in this group would not cause a data collision. Each square of a wavefront is examined independently and in parallel. In this case, squares C3 and D4 are identified as having a 1 in them so the requests will be granted for their respective virtual output queues. In step 326, the next wavefront (W1) is tested corresponding to FIG. 2C. Note that the group in FIG. 2C also does not have any rows or columns in common. In this case, squares A2 and E1 are identified as having a 1 in them so the requests will be granted for their respective virtual output queues. In steps 326 to 328, the other wavefronts up to WN-1 are tested. Note that in FIG. 2D, square C5 is not granted because square C3 was granted in wavefront W0 and granting square C5 would cause a data collision. FIG. 2E tests the next wavefront and identifies square B5 as having a 1 and not conflicting with any of the previously granted squares. Therefore, the request will be granted for square B5. FIG. 2F does have a 1 in square B1, but issuing a grant would conflict with square E1, which was previously granted.

Step 330 then compiles the signals from the arbiter login and provides a grant signal to the virtual output queues at the appropriate time to allow the data into the switch matrix 110. The grant signals is comprised of a number of grant signals i,j representing the row and column of the input port and desired output port. Step 332 represents the data transfer through the switch 100.

FIG. 3B shows the timing of the epochs and the loopback effect from step 330 to step 322. For each epoch, A represents the decision period and B represents the data transfer period. Since it would be unfair to choose the same initial wavefront W0, an aspect of the invention provides that the initial wavefront for a subsequent epoch can be different. For example, referring back to FIGS. 2A-F, the next epoch might use the FIG. 2C square group as the initial wavefront, then the FIG. 2D square group and so on. This is called a round robin technique. Another technique would be a random selection of the wavefronts represented in FIGS. 2C-F. Yet another technique would be to determine the array of non-conflicting matrix elements for an epoch P based at least in part on an earlier epoch P-x, where x is a natural number. For example, in testing the first request matrix of FIG. 2A, the controller may learn that there are a number of requests in a certain group that exhibit certain favored characteristics and the controller may then select that wavefront as the initial wavefront.

B. CONTROLLER AND ARBITRATION CIRCUITRY

Figure 4A:
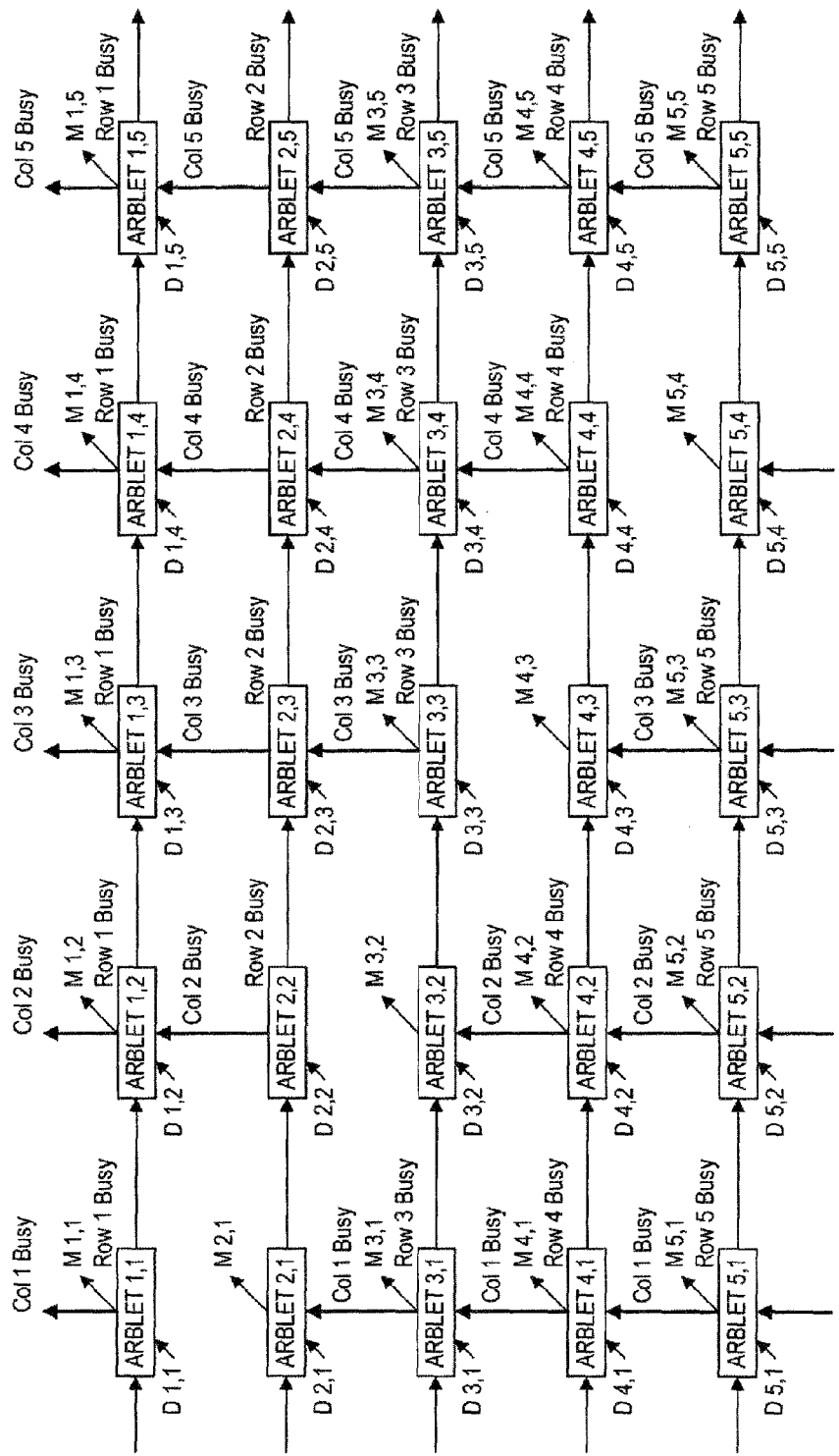
FIG. 4A depicts an arbiter circuit according to an embodiment of the invention.

FIG. 4A depicts an arbiter circuit according to an embodiment of the invention. The arbiter is part of the controller 140 shown in FIG. 1. In the exemplary embodiment, the arbiter 400 has the same dimensions as the switch matrix and request matrix (M×N). As shown, the arbiter includes a number of elements called arblets 450-11 to 450-ij, which are arranged in rows and columns (i,j) matching the M×N matrix, and which make the grant decisions and issue signals within the arbiter that form the controller's grant signal. Each arblet includes row input and a row output, a column input and a column output, and a data input and grant output. The controller grant signal is comprised of the collection of arblet grant outputs.

Note that FIG. 4A shows a set of arblets with their row and column inputs disconnected from the other arblets (450-1,1, 450-2,2, 450-3,3 . . . 450-i,j). This represents the logical circuit according an initial wavefront W0 such as shown in FIG. 2B, and not necessarily the physical structure of the arbiter 400. Additionally, note that a set of arblets 450-1,1 . . . 450-1,j appear to send their output signals to terminals along the top side of FIG. 4A and that a set of arblets 450-i,1 . . . 450-i,j appear to send their output signals to terminals along the right side of FIG. 4A. Also note that a set of arblets 450-2,1 . . . 450-1,1 appear to receive their input signals from the left side of FIG. 4A and that a set of arblets 450-i,1 . . . 450-i,j appear to receive their input signals from the bottom side of FIG. 4A. In one aspect of the invention, the arblets are connected to one another by the outputs along the right side of FIG. 4A matching with the inputs along the left side of FIG. 4A, and the outputs along the top side of the FIG. 4A matching with the inputs along the bottom side of FIG. 4A.

Figure 4B:
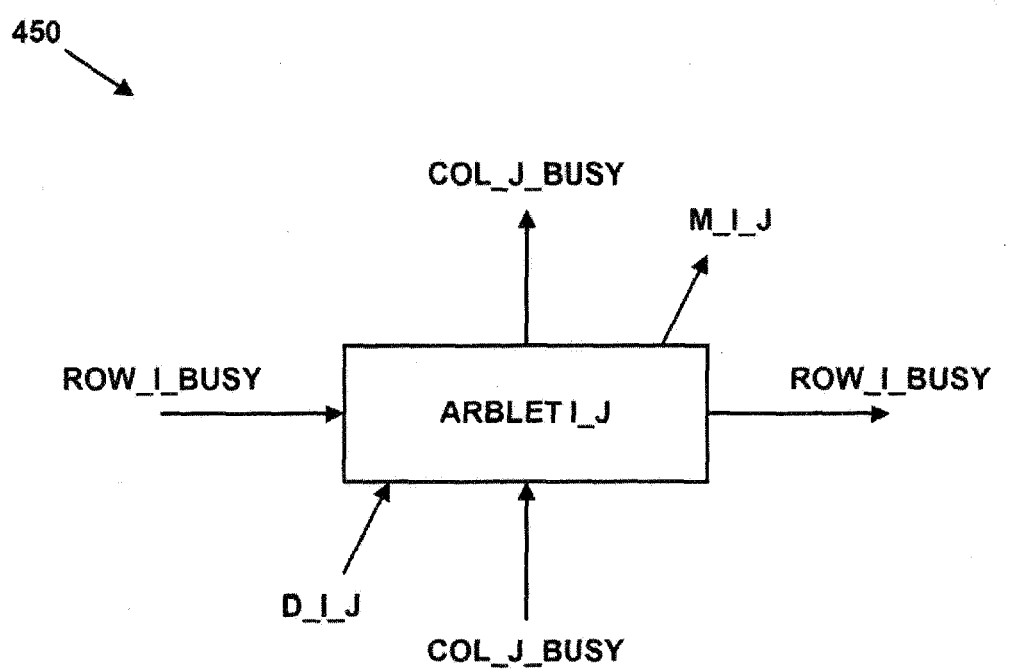
FIG. 4B depicts an arblet circuit according to an embodiment of the invention.

FIG. 4B depicts an arblet 450 (which is an arbitrary arblet) according to an embodiment of the invention. As shown, the arblet i,j has a row input called Row_i_Busy and a column input Col_j_Busy. The arblet also has a data input D_i_j that represents the data from the request matrix square corresponding to the arblet 450 at position i,j. The arblet generates a signal M_i_j depending on these inputs, according to the following table (x is don't care).

| Row_j_Busy | Column_j_Busy | D_i_j | M_i_j |
|---|---|---|---|
| 0 | 0 | 0 | 0 |
| 0 | 0 | 1 | 1 |
| 1 | x | x | 0 |
| x | 1 | x | 0 |

The output signals Row_i_Busy and Col_j_Busy are the same as their input values ORed with the M_i_j signal. That is, when Row_i_Busy, Col_j_Busy or M_i_j are 1, then the output signals Row_i_Busy and Col_j_Busy become 1.

The signals propagate through the arbiter circuit 400 through all the arblets. When an arblet decides to grant a virtual output queue access to the switch matrix (M_i_j is 1), the remainder of the signals in the same row and column are 1. This avoids data conflict in the switch matrix 110.

Once the request matrix has been evaluated by the arbiter, the controller sets to the switches in the switch matrix and issues the grant signal to the virtual output queues. Then data is safely sent through the switch matrix while the request matrix for the next epoch is evaluated.

As shown in FIG. 4A and described above, the arbiter circuit 400 has the outputs from the right side connected to the inputs at the left, and the outputs from the top side connected to the inputs at the bottom. While this is one potential configuration, there are others. One physical configuration is called a donut, and as the name implies, provides a loopback for the output signals from a set of arblets to the input to another set of arblets.

Figure 4C:
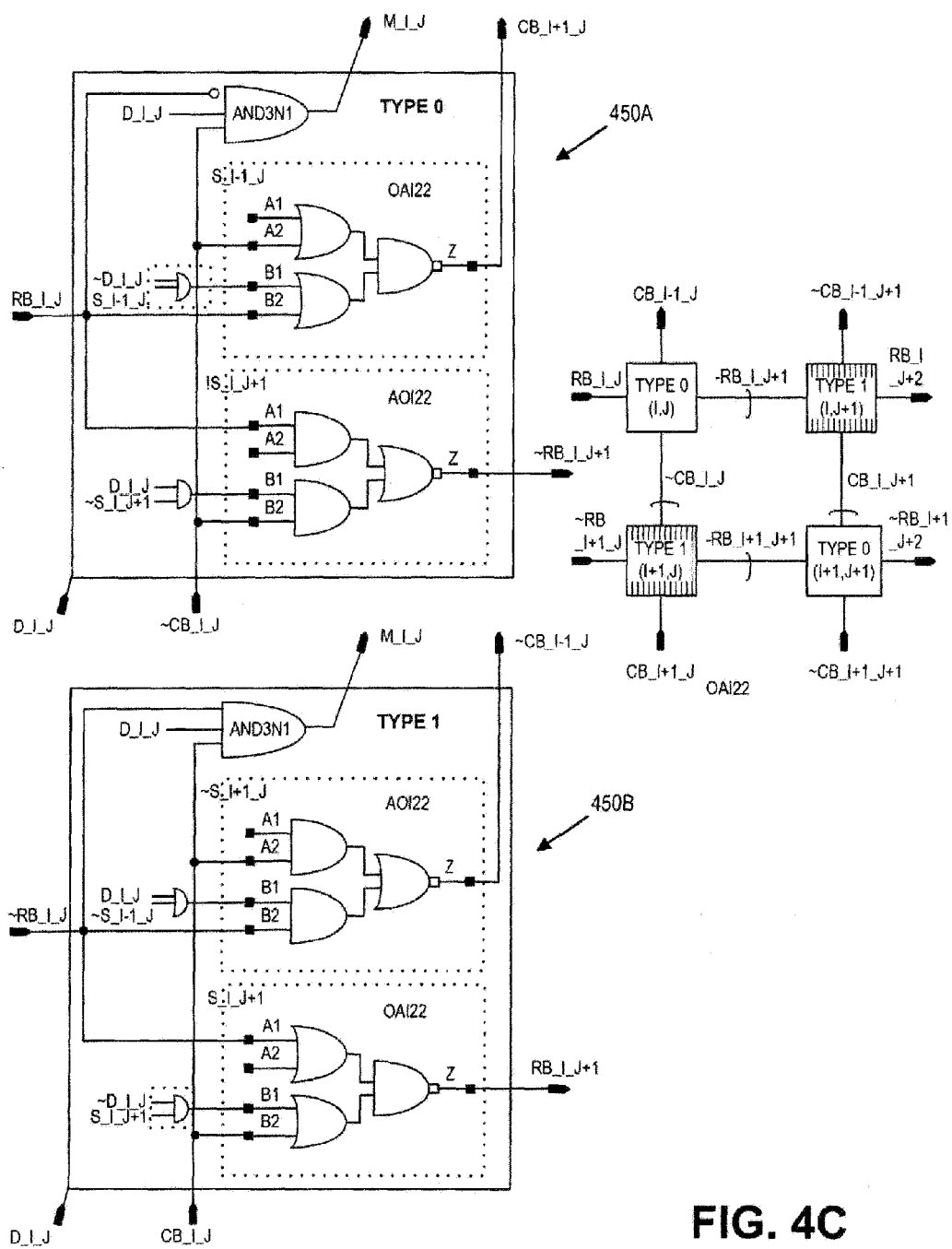
FIG. 4C depicts the internal circuitry of an arblet according to an embodiment of the invention.

FIG. 4C depicts two slightly different arblets 450a and 450b. The Row Busy and Column Busy signals propagate from one arblet to the next. To run the arblet at a high speed, the propagation delay of the row (column) busy should be minimized. A review of a typical logic library (example used IBM CU-11 process) identified two types of gates. AOI and OAI gates are the fastest among all standard gates and have the correct logical function. However, due to the logical inverter at the output of the AOI and OAI gates, they are arranged alternately to cancel out the inverter effect. As a result, two types of arblets are designed: type 0 (450a) and type 1 (450b). They are used in a checkerboard fashion, where type 0 arblets are used in the white squares and type 1 arblets are used in the black ones.

In accordance with another embodiment of the present invention, an arbitration pre-processor is employed to optimize fairness. In general, fairness represents a measure of average resource utilization in comparison to resource demand. In the current invention, fairness refers to the probability that any given arblet will be granted access to a specific output port. In a fair implementation, for example, all arblets would substantially have the same probability of a grant access.

Figures 5A, 5B, 5C, 5D:
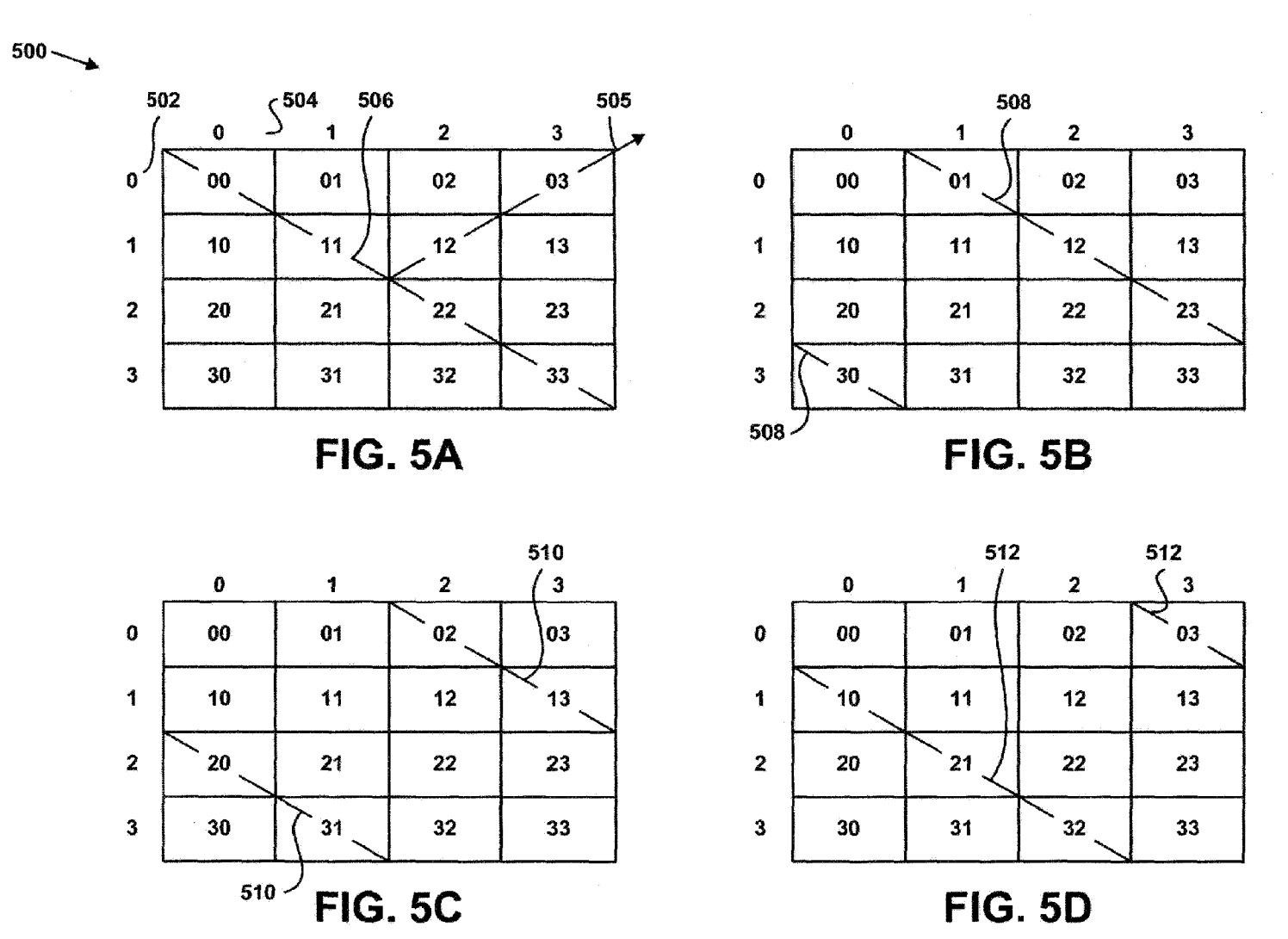

Referring now to FIG. 5A-D, a simplified matrix of arblets in a crossbar switch is illustrated, each with four rows 502 coupled to virtual output queues, and four columns 504 coupled to corresponding output ports. As commonly implemented, the arbiter will arbitrate a wavefront in the same direction 505 during each epoch, normally along a diagonal 505. This is commonly done to optimize arbitration performance, since varying the wavefront arbitration direction can also substantially increase functional complexity within the arbiter, requiring more logic processing steps. In FIG. 5A, the arbiter begins wavefront arbitration along diagonal 506, from element 00 to element 33. In FIG. 5B, the arbiter moves the wavefront to diagonal 508, from element 01 to element 30. In FIG. 5C, the arbiter moves the wavefront again to diagonal 510, from element 02 to element 31. And finally, in FIG. 5D, the arbiter moves the wavefront to diagonal 512, from element 03 to element 32. In this implementation, elements in the initial diagonal 506 will tend to be evaluated first, and hence will be given priority over other elements in the matrix. For example element 00 will always be evaluated before element 01, and hence will unfairly be given a higher probability of accessing an output port.

Figure 6:
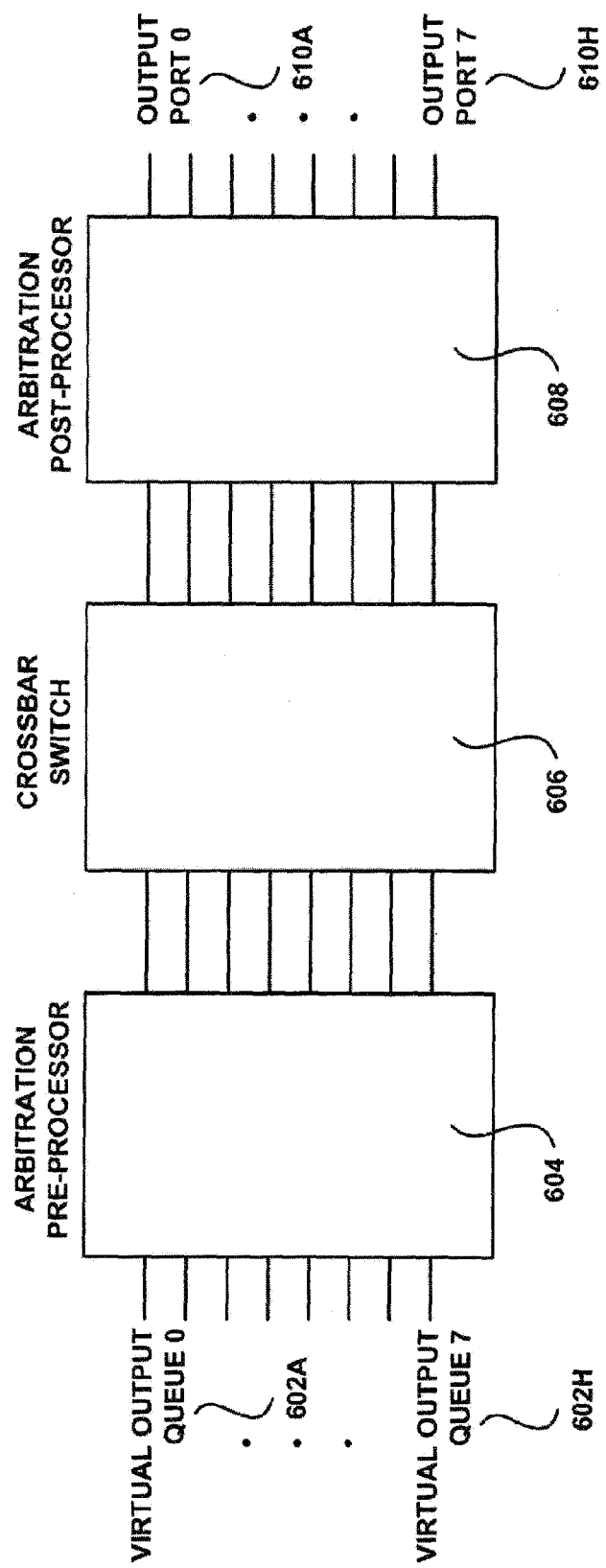
FIG. 6 depicts a crossbar switch with the addition of an arbitration pre-processor and an arbitration post-processor according to an embodiment of the invention.

Referring now to FIG. 6, the crossbar switch 500 of FIG. 5A-D is shown, with the addition of an arbitration pre-processor 604 and an arbitration post-processor 608. In a non-obvious fashion, arbitration pre-processor 604 substantially improves the fairness of crossbar switch 500, by successively re-mapping the virtual output queues 602 to new non-conflicting positions in a mapping matrix, based in part, on a pre-defined mapping algorithm implemented as a series of coupled nodes or logic switches. Crossbar switch 500, unaware of any change, arbitrates these re-mapped virtual output queues in a normal fashion, and then passes the results to arbitration post-processor 608, which subsequently re-maps the granted virtual output queues to the appropriate output ports 610. Furthermore, the pre-defined mapping algorithm can be further configured during crossbar switch 500 operation through the use of mapping algorithm inputs. Advantages of the invention include improving arbitration fairness without substantial detriment to arbiter performance.

Referring now to FIG. 7A-D, a simplified matrix of virtual output queues for arbitration-preprocessor 604 of FIG. 6 is shown, in which a rotation mapping algorithm is employed. Based on the mapping algorithm inputs, rotation mapping algorithm re-maps the virtual output queues 702, so that wavefront arbitration begins along a different diagonal from the original un-mapped matrix. Referring to FIG. 7A, an un-mapped matrix is shown, in which the arbiter will begin wavefront arbitration along diagonal 706, from element 00 to element 33, as in FIG. 5. Referring now to FIG. 7*b*, the rotation mapping algorithm has re-mapped the virtual output queues so that wavefront arbitration begins along diagonal 708, from element 01 to element 30, which is one column offset position to the right of diagonal 706. Referring now to FIG. 7C, the rotation mapping algorithm has re-mapped the virtual output queues so that wavefront arbitration begins along diagonal 710, from element 10 to element 03, which is one row offset position below of diagonal 706. And referring now to FIG. 7D, the rotation mapping algorithm has re-mapped the virtual output queues so that wavefront arbitration begins along diagonal 712, from element 11 to element 00, which is both one row offset position below and column offset position to the right of diagonal 706. Using the rotation mapping algorithm, for example, up to n statistical combinations can be achieved, where n is the number of virtual output ports. Advantages of the invention include improving arbitration fairness by periodically allowing each virtual output queue be positioned along the initial arbitration wavefront diagonal.

Figure 7E:
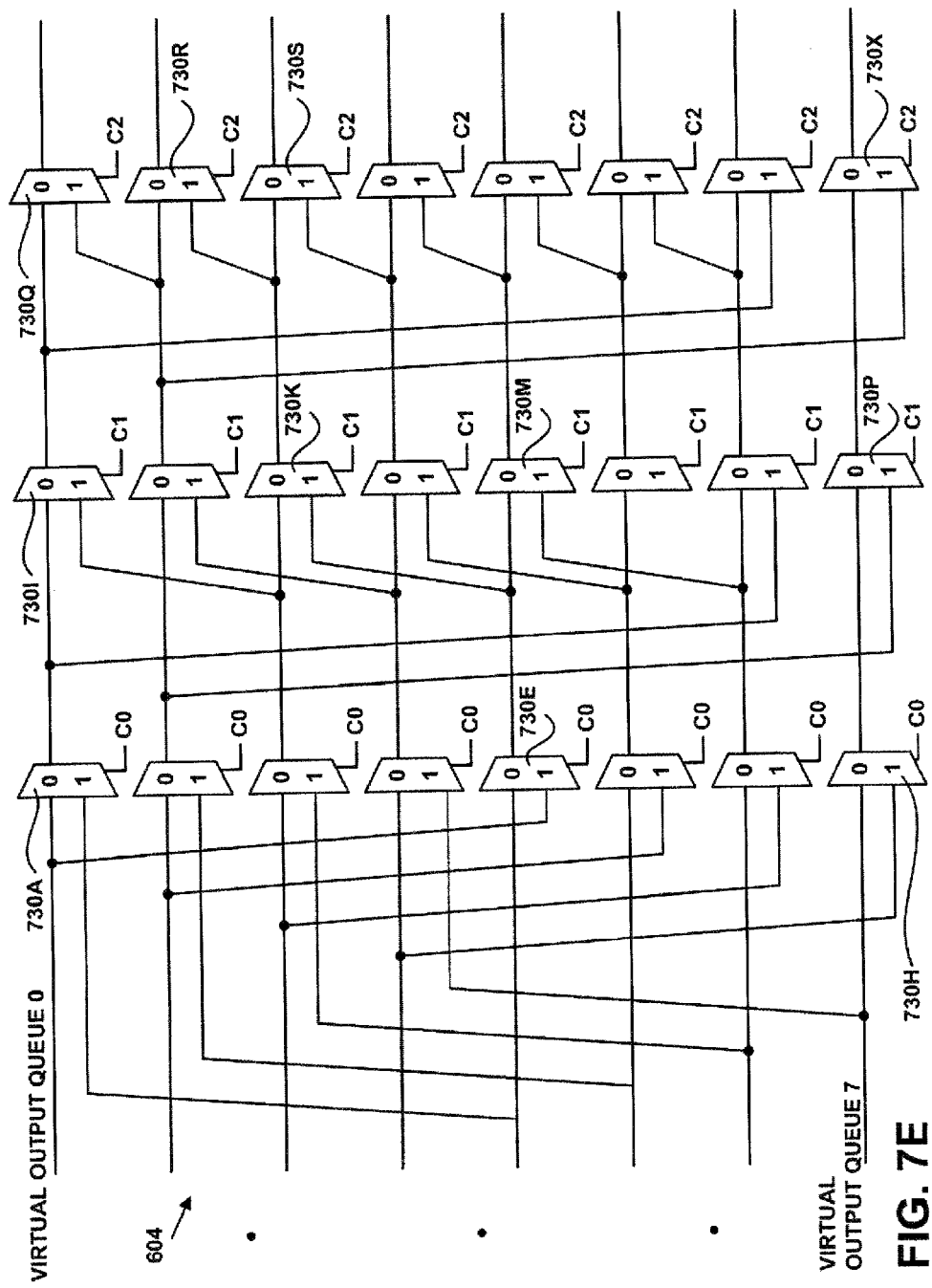
FIG. 7E depicts a simplified functional logic diagram for arbitration-preprocessor employing a rotation mapping algorithm according to an embodiment of the invention.

Referring now to FIG. 7E, a simplified functional logic diagram for arbitration-preprocessor 604 of FIG. 6 is shown, in which a rotation mapping algorithm is employed. Twenty-four logical mux elements 730 are coupled together, with a stage 0 comprising elements 730*a-h*, stage 1 comprising elements 730*i-p*, and stage 2 comprising elements 730*q-x*. Mapping algorithm inputs are shown as c0, c1, and c2, while row or column positions of virtual output queues are shown as inputs 0 or 1 to switches 810*a-h*. Initially in stage 0, each virtual output queue is coupled to input 0 of a mux element, and input 1 of a mux element that is four positions away. For example, virtual output queue 0 is coupled to input 0 of mux element 730*a*, and input 1 of mux element 730*e*, four positions away. At stage 1, the output of each mux element of stage 0, is further coupled to input 0 of a mux element, and input 1 of a mux element that is two positions away. For example, the output from mux element 730*e* is coupled to input 0 of mux element 730*m*, and input 1 of mux element 730*k*, two positions away. And at stage 2, the output of each mux element of stage 1, is further coupled to input 0 of a mux element, and input 1 of a mux element that is one position away. For example, the output from mux element 730*k* is coupled to input 0 of mux element 730*s*, and input 1 of mux element 730*r*, one position away.

In another aspect of the current invention, the arbitration-preprocessor implements a hierarchical mapping algorithm. In one embodiment, a binary tree topology is used. The hierarchical mapping algorithm subsequently re-maps the row or column position of virtual output queues in stages, into successively smaller groups, based on the mapping algorithm inputs. For example, the hierarchical mapping algorithm initially divides the virtual output queue into two halves. If the mapping algorithm input is true at this stage, the row or column position of each element the first group is swapped with the row or column position of the corresponding element of the second group (i.e., the first element in the first group with the first element in the second group, etc.) Each of these groups is then further divided into two smaller groups, and the process is again repeated. Furthermore, the hierarchical mapping algorithm can also allow arbitration pre-processor 604 to swap both row and column position by first processing for one and then subsequently processing for the other.

Figure 8:
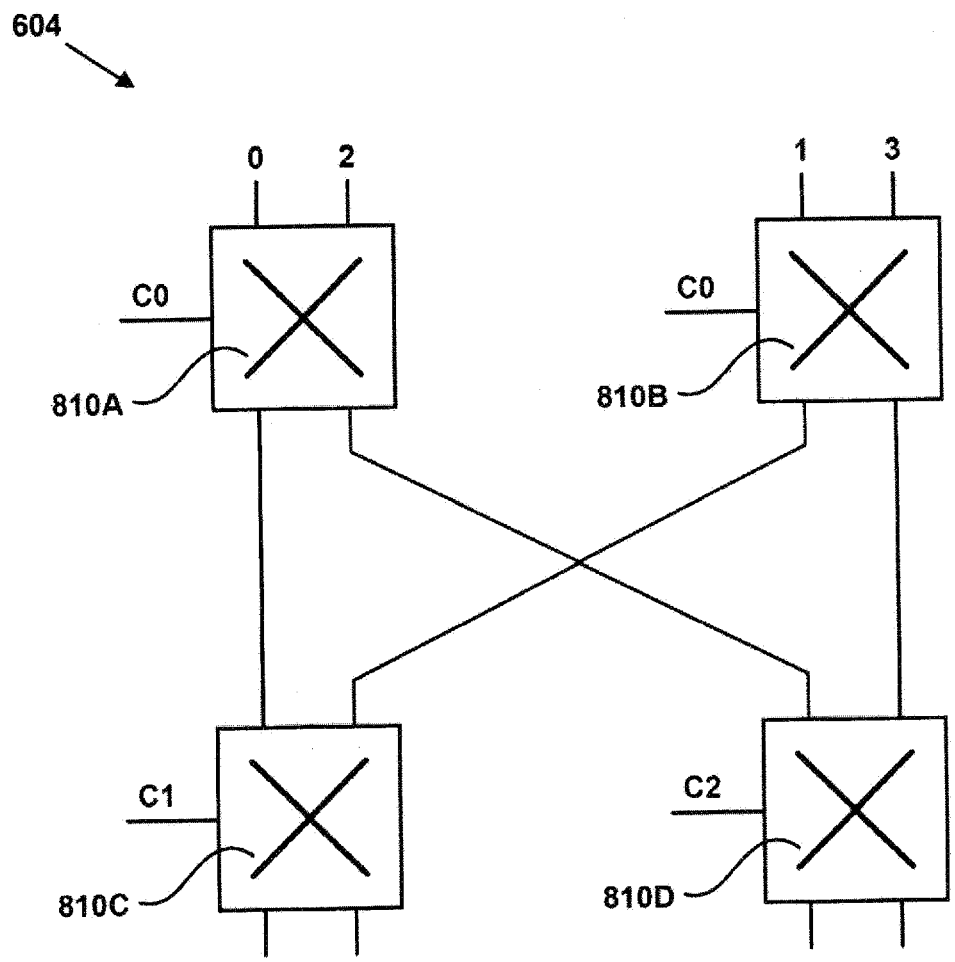
FIG. 8 depicts a simplified functional logic diagram for an arbitration-preprocessor employing a hierarchical mapping algorithm according to an embodiment of the invention.

Referring now to FIG. 8, a simplified functional logic diagram for arbitration-preprocessor 604 of FIG. 6 is shown, in which a hierarchical mapping algorithm is employed. Four logical switches 810 are coupled together, with a stage 0 comprising switches 810*a-b*, and a stage 1 comprising switches 810*c-d*. Mapping algorithm inputs are shown as c0, c1, and c2, while row or column positions of virtual output queues are shown as inputs 0-3 to switches 810*a-b*. Initially in stage 0, inputs 0-3 are divided between switches 810*a-b*, with inputs 0 and 2 coupled to switch 810*a*, and inputs 1 and 3 coupled to switch 810*b*. If mapping algorithm input c0 is true, then no mapping occurs since input 0 and 1 are forwarded to switch 810*c*, and input 2 and 3 are forwarded to switch 810*d*. That is, the two halves of 0-1 and 2-3 remain in the original sequence of 0-3. If mapping algorithm input c0 is false, input 2 and 3 are forwarded to switch 810*c*, and input 0 and 1 are forwarded to switch 810*d*, mapping each half's row or column position to that of the other. At stage 1, the process is repeated. However, at this stage, there are two independent mapping algorithm inputs as opposed to just one, as in the previous stage. Subsequent stages can have $2^n$ mapping algorithm inputs, where n is the stage number.

Referring now to FIG. 9A-D, a simplified matrix of virtual output queues for arbitration-preprocessor 604 of FIG. 6 is shown, employing a hierarchical mapping algorithm. Based on the mapping algorithm inputs, rotation mapping algorithm re-maps the virtual output queues 902 to change the relative position of virtual output queues to each other, as compared to the original un-mapped matrix. Referring to FIG. 9A, an un-mapped matrix is shown, in which the arbiter will begin wavefront arbitration along diagonal 906, comprising elements 00, 11, 22, 33 to element 33, as in FIG. 5. Referring now to FIG. 9B, the hierarchical mapping algorithm has re-mapped the virtual output queues by rows so that wavefront arbitration begins along a new diagonal 908, comprising elements 10, 01, 32, and 23. Referring now to FIG. 9C, the hierarchical mapping algorithm has re-mapped the virtual output queues by columns so that wavefront arbitration begins along a new diagonal 910, comprising elements 01, 10, 23, and 32. And referring now to FIG. 9D, the hierarchical mapping algorithm has re-mapped the virtual output queues by both rows and columns, so that wavefront arbitration begins along a new diagonal 912, comprising elements 01, 00, 33, and 22. Using a binary tree topology, for example, up to $2^{n-1}$ statistical combinations can be achieved, where n is the number of virtual output ports. Advantages include improving arbitration fairness by increasing the possible non-conflicting combinations available for changing the relative position of individual elements within virtual output queues.

In another aspect of the current invention, an arbitration-preprocessor implements a switch network mapping algorithm. In one embodiment, the switch network mapping algorithm uses a butterfly topology. Furthermore, the switch network mapping algorithm re-maps pairs of element row or column positions within virtual output queues, in stages based on mapping algorithm inputs. For example, the switch network mapping algorithm initially pairs every element with another element. If the mapping algorithm input is true at this stage, the row or column position of each element is swapped. The process is again repeated until desired The switch network mapping algorithm can also allow arbitration pre-processor 604 to swap both row and column position by first processing in one and then subsequently processing the other. Unlike the hierarchical mapping algorithm, as shown in FIG. 8, the switch network mapping algorithm can have n number mapping algorithm inputs per stage, where n is half the number of coupled virtual output queues. For example, eight virtual output queues can require four mapping algorithm inputs per stage.

Figure 10:
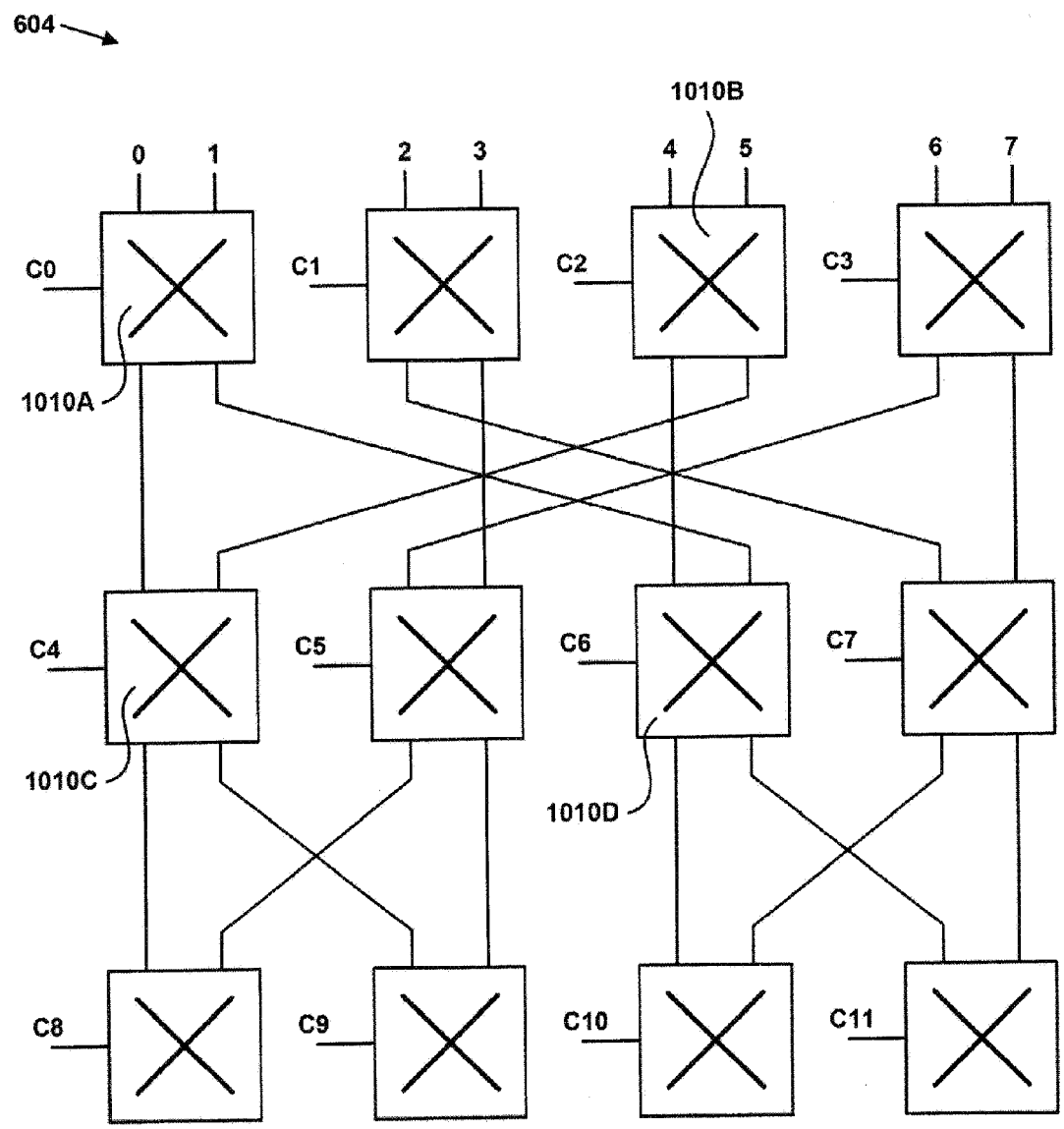

Referring now to FIG. 10, a simplified functional logic diagram for arbitration-preprocessor 604 of FIG. 6 is shown, employing a switch network mapping algorithm. Twelve logical switches 1010 are coupled together using a butterfly topology, with each stage comprising four switches. Furthermore, each switch utilizes a different mapping algorithm input. For example, the first output port of switch 1010*a* is coupled to the first input port of switch 1010*c*. While the second output port of switch 1010*a* is coupled to the second input port of switch 1010*d*. Furthermore, the first output port of switch 1010*b* is coupled to the first input port of switch 1010*c*. While the second output port of switch 1010*b* is coupled to the second input port of switch 1010*c*. Mapping algorithm inputs are shown as c0 for switch 1010*a*, c2 for 1010*b*, c4 for switch 1010*c*, and c6 for switch 1010*d*. Initially in the first stage, if mapping algorithm input c0 of switch 10101*a* is true, then input 0 is forwarded to switch 1010*c*, and input 1 is forwarded to switch 1010*d*. If mapping algorithm input c0 of switch 10101*a* is false, then the reverse happens, input 1 is forwarded to switch 1010*c*, and input 0 is forwarded to switch 1010*d*. Likewise, if mapping algorithm input c2 is true, then input 4 is forwarded to switch 1010*d*, and input 5 is forwarded to switch 1010*c*. If mapping algorithm input is false, then the reverse happens, input 5 is forwarded to switch 1010*d*, and input 4 is forwarded to switch 1010*c*. This process is repeated for each switch in each stage of arbitration-preprocessor 604. Using a butterfly topology, for example, up to $2^{n/2 \log n}$ statistical combinations can be achieved, where n is the number of virtual output ports. Advantages include improving arbitration fairness by substantially increasing the possible non-conflicting combinations available for changing the relative position of individual elements within virtual output queues.

C. CONCLUSION

Advantages of the invention include the ability to manage high data rates using a crossbar switch, as well as improving arbitration fairness without substantial detriment to crossbar switch performance.

While this invention has been described in terms of several preferred embodiments, there are alterations, permutations, and equivalents which fall within the scope of this invention. For example, although reference is given to binary tree and butterfly topologies, it should be understood that other topologies can be used. It should also be noted that there are many alternative ways of implementing the apparatuses of the present invention. It is therefore intended that the following appended claims be interpreted as including all such alterations, permutations, and equivalents as fall within the true spirit and scope of the present invention.

Having disclosed exemplary embodiments and the best mode, modifications and variations may be made to the disclosed embodiments while remaining within the subject and spirit of the invention as defined by the following claims.

The invention claimed is:

1. A method comprising:
   receiving, at a switch, first service request signals and second service request signals from virtual signal queues;
   mapping, in the switch, the virtual signal queues according to a first mapping;
   arbitrating, in the switch, the first service request signals in accordance with the first mapping of the virtual signal queues; and
   re-mapping, in the switch, the virtual signal queues according to a second mapping, different from the first mapping, to allow arbitrating of the second service request signals in accordance with the second mapping of the virtual signal queues.

2. The method according to claim 1, further comprising:
   representing the first service request signals and the second service request signals in the form of rows and columns of a matrix.

3. The method according to claim 2, wherein the arbitrating includes iteratively scanning the matrix to determine whether a service request signal, from among the first service request signals or the second service request signals, should be granted.

4. The method of claim 3, wherein the iteratively scanning includes commencing the iterative scanning of the first service request signals at a first diagonal of the matrix.

5. The method of claim 4, wherein the re-mapping includes re-mapping the virtual signal queues to allow commencing the iterative scanning of the second service request signals at a second diagonal of the matrix.

6. The method of claim 2, wherein the re-mapping includes re-mapping the virtual signal queues such that a position of a row or a column in the matrix is offset with respect to a respective previous position of the row or the column in the matrix.

7. The method of claim 2, wherein the re-mapping includes re-mapping the virtual signal queues such that positions of a row and a column in the matrix are offset with respect to respective previous positions of the row and the column in the matrix.

8. The method of claim 2, wherein the re-mapping includes re-mapping the virtual output queues without creating a conflict between two service request signals represented in the matrix.

9. The method of claim 1, wherein the re-mapping includes re-mapping the virtual signal queues based on a mapping algorithm implemented as a series of nodes or logic switches.

10. The method of claim 1, wherein the re-mapping includes successively re-mapping the virtual signal queues such that each virtual signal queue is capable of being initially arbitrated during the arbitrating.

11. A switch comprising:
    a pre-processor configured to receive first service request signals and second service request signals from virtual signal queues, and to map the virtual signal queues according to a first mapping; and
    an arbitrator configured to arbitrate the first service request signals in accordance with the first mapping of the virtual signal queues, wherein
    the pre-processor is configured to re-map the virtual signal queues according to a second mapping, different from the first mapping, to allow the arbitrator to arbitrate the second service request signals in accordance with the second mapping of the virtual signal queues.

12. The switch of claim 11, wherein the first service request signals and the second service request signals are represented in the form of rows and columns of a matrix.

13. The switch of claim 12, wherein the arbitrator is configured to iteratively scan the matrix to determine whether a service request signal, from among the first service request signals or the second service request signals, should be granted.

14. The switch of claim 13, wherein the arbitrator is configured to iteratively scan the matrix by commencing the iterative scanning of the first service request signals at a first diagonal of the matrix.

15. The switch of claim 14, wherein the pre-processor is configured to re-map the virtual signal queues to allow the arbitrator to iteratively scan the matrix by commencing the iterative scanning of the second service request signals at a second diagonal of the matrix.

16. The switch of claim 12, wherein the pre-processor is configured to re-map the virtual signal queues such that a position of a row or a column in the matrix is offset with respect to a respective previous position of the row or the column in the matrix.

17. The switch of claim 12, wherein the pre-processor is configured to re-map the virtual signal queues such that the positions of a row and a column in the matrix are offset with respect to respective previous positions of the row and the column in the matrix.

18. The switch of claim 11, wherein the pre-processor is configured to re-map the virtual signal queues based on a mapping algorithm implemented as a series of nodes or logic switches.

19. The switch of claim 11, wherein the pre-processor is configured to successively re-map the virtual signal queues such that each virtual signal queue is capable of being initially arbitrated by the arbitrator.

20. A method comprising:

receiving, at a switch, a plurality of service request signals from respective virtual signal queues;

mapping, in the switch, the virtual signal queues according to a first mapping;

arbitrating, in the switch, a first set of service request signals, from among the plurality of service request signals, in accordance with the first mapping of the virtual signal queues; and re-mapping, in the switch, the virtual signal queues according to a second mapping, different from the first mapping, to allow arbitrating of a second set of service request signals, from among the plurality of service request signals, in accordance with the second mapping of the virtual signal queues.

* * * * *

UNITED STATES PATENT AND TRADEMARK OFFICE
CERTIFICATE OF CORRECTION

PATENT NO.        : 8,514,873 B2                              Page 1 of 1
APPLICATION NO.   : 12/890551
DATED             : August 20, 2013
INVENTOR(S)       : Yang et al.

It is certified that error appears in the above-identified patent and that said Letters Patent is hereby corrected as shown below:

In the Specification:

Column 1, Line 10
Please replace "in turn, claims priority to U.S. Prov. No. 60/333,945," with --in turn, is related to U.S. Prov. Application Ser. No. 60/333,945,--.

Column 1, Line 11
Please delete the word "both".

Signed and Sealed this
Twelfth Day of November, 2013

Teresa Stanek Rea
*Deputy Director of the United States Patent and Trademark Office*